US012798624B2

(12) United States Patent
Hoevel et al.

(10) Patent No.: US 12,798,624 B2
(45) Date of Patent: Nov. 17, 2026

(54) METHOD FOR PREDICTING TRAJECTORIES OF ROAD USERS BY ALLOCATING LATENT FEATURES TO A DYNAMIC OCCUPANCY MAP

(71) Applicant: Aptiv Technologies AG, Schaffhausen (CH)

(72) Inventors: Pascal Hoevel, Düsseldorf (DE); Maximilian Schaefer, Wuppertal (DE); Kun Zhao, Düsseldorf (DE)

(73) Assignee: Aptiv Technologies AG, Schaffhausen (CH)

( * ) Notice: Subject to any disclaimer, the term of this patent is extended or adjusted under 35 U.S.C. 154(b) by 151 days.

(21) Appl. No.: 18/628,703

(22) Filed: Apr. 6, 2024

(65) Prior Publication Data

US 2024/0359709 A1 Oct. 31, 2024

(30) Foreign Application Priority Data

Apr. 28, 2023 (EP) .................................... 23170740

(51) Int. Cl.
*B60W 60/00* (2020.01)
*G06V 20/58* (2022.01)

(52) U.S. Cl.
CPC ......... *B60W 60/0027* (2020.02); *G06V 20/58* (2022.01)

(58) Field of Classification Search
None
See application file for complete search history.

(56) References Cited

U.S. PATENT DOCUMENTS

2016/0012301 A1* 1/2016 Arndt ..................... G06V 20/58 382/104
2019/0079526 A1* 3/2019 Vallespi-Gonzalez ...................... G06V 20/58
2024/0101157 A1* 3/2024 Pronovost ................ G06N 3/04

OTHER PUBLICATIONS

Extended European Search Report regarding European Patent Application No. 23170740.7, dated Jul. 13, 2023.
Context-Aware Scene Prediction Network (CASPNet), M. Schaefer, et al., 2022 IEEE 25th International Conference on Intelleigent Transportation Systems (ITSC), Oct. 12, 2022.
"TraPHic: Trajectory Prediction in Dense and Heterogeneous Traffic Using Weighted Interactions," R. Chandra et al., arxiv,org, Cornell University Library, Jul. 31, 2021.
(Continued)

*Primary Examiner* — Brian P Sweeney
*Assistant Examiner* — Jonathan E Reinert
(74) *Attorney, Agent, or Firm* — Harness, Dickey & Pierce, P.L.C.

(57) ABSTRACT

A method is provided for predicting trajectories of a plurality of road users. For each road user, a set of characteristics detected by a perception system of a vehicle is determined, wherein the set of characteristics includes specific characteristics associated with a predefined class of road users. The set of characteristics is transformed to a set of input features for a prediction algorithm via a processing unit of the vehicle, wherein each set of input data comprises the same predefined number of data elements. At least one respective trajectory for each of the road users is determined by applying the prediction algorithm to the input data.

3 Claims, 8 Drawing Sheets

(56) References Cited

OTHER PUBLICATIONS

"Joint Prediction for Kinematic Trajectories in Vehicle-Pedestrian-Mixed Scenes," H. Bi, et al., 2019 IEEE/CVF International Conference on Computer Vision (ICCV), Oct. 27, 2019.
"DESIRE: Distant Future Predictin in Dynamic Scenes with Interacting Agents,", N. Lee et al., Apr. 14, 2017.
"Social GAN: Socially Acceptable Trajectories with Generative Adversarial Networks," A. Gupta, et al., Mar. 29, 2018.
"SoPhie: An Attentive GAN for PredictingPaths Compliant to Social and Physical Constraints," A. Sadeghian et al., Sep. 20, 2018.
"Uncertainty-aware Short-term Motion Prediction of Traffic Actors for Autonomous Driving," N. Djuric, Uber Advanced Technologies Group, Mar. 4, 2020.

* cited by examiner

Fig. 5
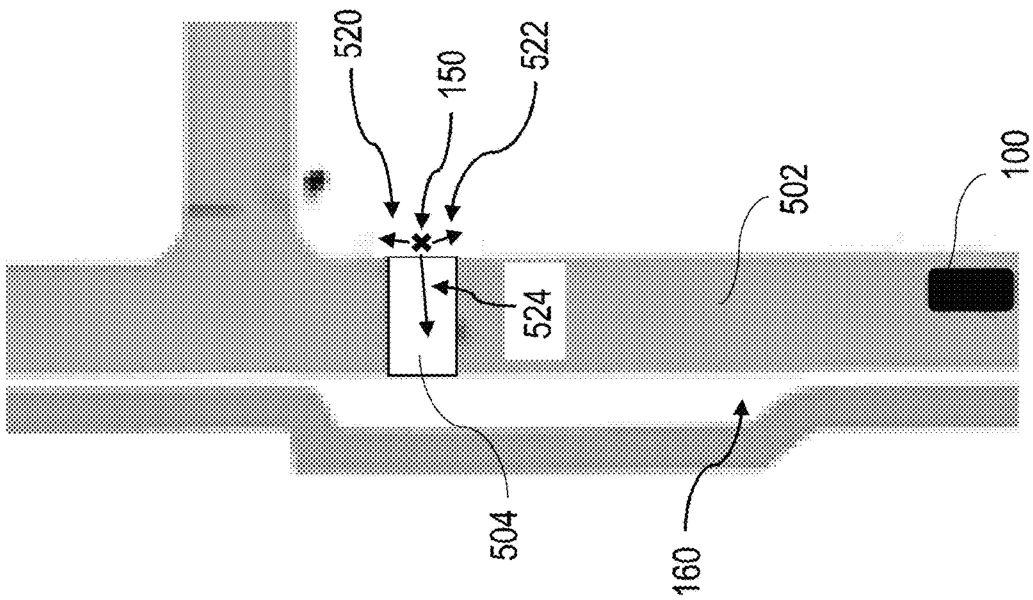
Fig. 5B
Related Art
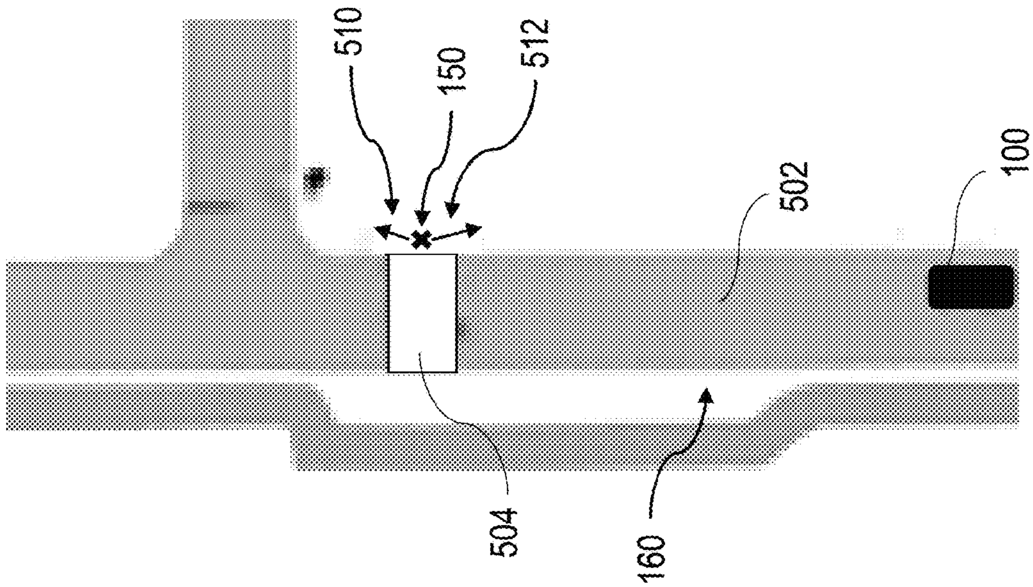
Fig. 5A

METHOD FOR PREDICTING TRAJECTORIES OF ROAD USERS BY ALLOCATING LATENT FEATURES TO A DYNAMIC OCCUPANCY MAP

CROSS-REFERENCE TO RELATED APPLICATIONS

This application claims the benefit and priority of European patent application number 23170740.7, filed on Apr. 28, 2023. The entire disclosure of the above application is incorporated herein by reference.

FIELD

This section provides background information related to the present disclosure which is not necessarily prior art.

The present disclosure relates to a method for predicting respective trajectories of a plurality of road users.

BACKGROUND

For autonomous driving and various advanced driver-assistance systems (ADAS), it is an important and challenging task to predict the future motion of road users surrounding a host vehicle. Planning a safe and convenient future trajectory for the host vehicle heavily depends on understanding the traffic scene in the external environment of the host vehicle and anticipating its dynamics.

In order to predict the future trajectories of surrounding road users precisely, the influence of the static environment like lane and road structure, traffic signs etc. and, in addition, the interactions between the road users need to be considered and modelled. The interactions between road users have different time horizons and various distances which leads to a high complexity. Therefore, the complex interactions between road users are practically not feasible to model with traditional approaches.

The task of predicting the future trajectories of road users surrounding a host vehicle was addressed by jointly learning and predicting the motion of all road users in a scene surrounding the host vehicle in M. Schaefer et al.: "Context-Aware Scene Prediction Network (CASPNet)", arXiv: 2201.06933v1, Jan. 18, 2022. In this paper, an architecture including a convolutional neural network (CNN) and a recurrent neural network (RNN) is proposed which relies on grid-based input and output data structures. In detail, the neural network comprises a CNN-based trajectory encoder which is suitable for learning correlations between data in a spatial structure. As an input for the trajectory encoder based on the CNN, characteristics of road users are rasterized in a two-dimensional data structure in bird's-eye view in order to model the interactions between the road users via the CNN.

Although various types and numbers of road users are supported by the procedure according to the paper mentioned above, the same features or characteristics have to be used to describe each road users' dynamic, i.e. regardless of the respective road user's type or object class. An example for two different types or object classes of road users are pedestrians and vehicles for which the same features or characteristics such as position, velocity and type or class have to be used.

However, different types or object classes of road users may have their own specific characteristics, i.e. in addition to the common characteristics like position, dimensions, velocity and type. For example, the type "vehicle" has characteristics regarding the current status of the brake lights and the current status of turning signals. On the other hand, the type "pedestrian" has other specific characteristics such as heading direction, facing direction and gesture.

For the input data, the method according to the paper mentioned above requires a common data representation on a grid map, i.e. the same rasterization, for different types or classes and numbers of road users. For each cell or pixel of such a grid map, a set of channels is defined, each of which is expected to include the same type of a common characteristic for each road user, i.e. the same channels for the position, for the velocity and for the type of the respective road users are associated with the respective pixel of the grid map. Conversely, different features or characteristics which are unique and specific for a certain type of road user, like body and/or head orientation and gesture for pedestrians or heading angles and turning signals for vehicles, should not be represented by the same channels of the rasterized grid map according to the former method. If the same channel were used for different characteristics of e.g. two type of road users, e.g. the same channel for the body orientation of a pedestrian and a turning signal of a vehicle, this might have a negative impact on the prediction quality of the neural networks applied by the former method. However, some of these specific characteristics of a certain road user may be important to support and/or improve the prediction quality for the road users' trajectory.

Accordingly, there is a need to have a method which is able to consider specific properties of different kinds of road users when predicting trajectories of the road users.

SUMMARY

This section provides a general summary of the disclosure, and is not a comprehensive disclosure of its full scope or all of its features.

The present disclosure provides a computer implemented method, a computer system, a vehicle and a non-transitory computer readable medium according to the independent claims. Embodiments are given in the subclaims, the description and the drawings.

In one aspect, the present disclosure is directed at a computer implemented method for predicting respective trajectories of a plurality of road users. According to the method, for each road user a respective set of characteristics detected by a perception system of a host vehicle is determined, wherein the set of characteristics includes specific characteristics associated with a predefined class of road users. For each of the road users, the set of characteristics is transformed to a respective set of input data for a prediction algorithm via a processing unit of the host vehicle, wherein each set of input data comprises the same predefined number of data elements. At least one respective trajectory for each of the road users is determined via the processing unit by applying the prediction algorithm to the input data.

The respective trajectories which are to be predicted for the plurality of road users may include trajectories of other vehicles and trajectories of pedestrians as well as a trajectory of the host vehicle. The trajectory characteristics may include a position, a velocity and an object class for each of the respective road users. The position and the velocity of each road user may be provided in bird's eye view, i.e. by two respective components in a two-dimensional coordinate system having its origin at a predefined position at the host vehicle.

The specific characteristics which are part of the respective set of characteristics for the different types of road users may include a body orientation, a head orientation and/or a gesture for the object class "pedestrian", and the characteristics heading angle and turning signal for the object class "vehicle", for example. After the transformation via the embedding algorithm, the specific set of characteristics for each individual road user is represented by the same predefined number of data elements of the respective set of input data. In other words, each set of input data for the prediction algorithm may be regarded as a respective vector having a fixed number of vector components. While the characteristics describe actual physical properties of the respective road user, due to the transformation the data elements may be abstract entities which have to be suitable as an input for the prediction algorithm. Due to the transformation, different numbers and types of the specific characteristics can be determined by the method for the respective predefined class of road users. For example, more specific characteristics may be considered for pedestrians in comparison to the characteristics of vehicles.

Since the method considers the different types of specific characteristics for each class of road users, these specific features support the prediction of the respective trajectory of the road user. For example, the heading direction and/or the gesture of a pedestrian may be additional indicators for the pedestrian's future trajectory and may be able to increase the reliability for the prediction. On the other hand, known systems which are not able to consider such specific characteristics for a respective class of road users are not able to consider such information. Therefore, the method according to the present disclosure provides an early recognition of the correct future trajectory for a specific road user by incorporating the specific characteristic for the class to which the respective road user belongs.

According to an embodiment, each set of input data may include a set of latent features. Transforming the respective set of characteristics for each of the road users to the respective set of input data may comprise applying an embedding algorithm to the respective set of characteristics in order to generate the corresponding set of latent features. The latent features may be allocated to a dynamic grid map of a predefined region of interest in the environment of the host vehicle, wherein the dynamic grid map may include a predefined number of pixels. The prediction algorithm may be applied to the allocated latent features for determining respective occupancy information for each class of the road users and for each pixel of the grid map, and the at least one respective trajectory for each of the road users may be determined by using the respective occupancy information for each pixel.

The term "dynamic grid map" is used in context of the allocation of the latent features since these may be considered an embedded version of characteristics being related to the dynamics of each road user. In contrast, a static grid map may be defined and applied for representing a static context of the host vehicle. Due to the fixed or constant number of data elements of the input data for the prediction algorithm, a fixed number of latent features may also be required as an output of the respective embedding algorithm regardless of the class of the road user. Due to the fixed number of the latent features, these may be suitable for a rasterization on the dynamic grid map representing the environment of the host vehicle.

The occupancy information for each pixel may include respective occupancy probabilities for each specific class and respective offsets in two perpendicular directions with respect e.g. to the center of each pixel or cell. This occupancy information may be provided for a predefined set of future time steps, i.e. there is a sequence of occupancy maps, each of which is associated with one of the future time steps. From this sequence of occupancy grids, the at least one respective trajectory may be derived for each road user, e.g. by connecting the points given by the cells or pixels having the highest occupancy probability for each class of road users and by the respective offsets for these cells or pixels. However, the method may be able to predict more than one trajectory for each road user.

The embedding algorithm and the prediction algorithm may be part of the same machine learning algorithm, e.g. part of a common neural network. In this case, the embedding algorithm may be realized by a respective set of layers for each type or class of road users. For example, the embedding of the type "vehicle" may include specific embedding layers which may be different from other embedding layers being used for the object type or class "pedestrian".

Moreover, transforming the set of characteristics to the respective set of input data may be performed separately for each class of road users by applying a separated embedding algorithm being defined for the respective class to the respective set of characteristics. For example, such a specific embedding algorithm may include a specific set of layers of a neural network for the respective object class. Different sets of parameters may be determined during the training of the neural network for the specific layers. Hence, each object class of road users may be embedded separately under consideration of the respective specific characteristics. Such an independent embedding improves the reliability of the entire machine learning algorithm when performing the method.

In addition, a number and a type of the specific characteristics may be different for the different classes of the road users. This may increase the flexibility of the method.

According to a further embodiment, applying the prediction algorithm may include: encoding the sets of input data including the allocated latent features, determining static environment data via the perception system of the host vehicle and/or a predefined map, encoding the static environment data, fusing the encoded sets of input data and the encoded static environment data in order to obtain fused encoded features, and decoding the fused encoded features via the processing unit in order to determine the respective occupancy information for each class of the road users and for each pixel of the grid map.

For example, a joint machine learning algorithm may include the embedding algorithm and the prediction algorithm and may be executed via the processing unit of the host vehicle for transforming the set of characteristics of the road users to a respective set of input data, for encoding the sets of input data and the static environment data, and for decoding the fused encoded features. The computational effort for the method may be reduced by using the joint machine learning algorithm.

Moreover, a joint training of the embedding algorithm and the prediction algorithm may be performed for the steps of transforming, encoding, fusing and decoding. Due to the joint training, the computational effort for performing the method may be reduced, and the reliability of the method may be enhanced.

According to a further embodiment, the static environment data is provided by a static grid map which includes a first rasterization for the region of interest, and the latent features may be allocated to the dynamic grid map by using second rasterization, wherein the second rasterization may be independent from the first rasterization. That is, the first rasterization may be performed for the region of interest, and then one grid map, i.e. the static grid map, may be generated for representing the static context of a scene in the environment of the host vehicle. Similarly, a second rasterization may be performed on the same or a different region of interest, and a second grid map, i.e. the dynamic grid map, may be generated for representing the dynamics of the scene. The first and second rasterizations may be different in that different parameters may be applied. This may enhance the flexibility when considering different types or classes of road users moving e.g. with strongly different velocities.

A position of a respective road user may be determined by the perception system of the host vehicle, and allocating the latent features to the grid map may rely on the position of the respective road user. The position may be provided in two dimensions, i.e. in bird's eye view with respect to the host vehicle. The position of the respective road user may be determined in addition to the respective set of characteristics for this road user. Hence, determining the road user's position may support the allocation step and provide necessary information on which the output of the method relies.

The position of the respective road users may be represented by a pixel of the grid map which is occupied by the respective road user, and by respective offsets in two perpendicular directions with respect to a predetermined position within the respective pixel. For example, the pixel may include indices which uniquely define the position of the respective pixel within the grid if the resolution of the grid is defined in advance. In addition, each pixel may include multiple channels which represent the characteristics of the respective road user being transformed to the latent features. The predetermined position within the respective pixel may include a corner or the middle of a square or a rectangle representing the respective pixel in bird's eye view, for example.

The latent features may be concatenated with the offsets being associated with the position of the respective road user within the respective pixel for each road user. If N latent features are output by the transforming step for each road user, each pixel of the grid map may include N+2 channels after the rasterization of the latent features since the two offsets are additionally considered. The result of this concatenation, i.e. the content of N+2 channels per pixel, may be provided as the input data for the prediction algorithm.

The set of characteristics may further include common characteristics which are defined for all road users. For example, the common characteristics may include the position and velocity for each road user. That is, reliable characteristics of known trajectory prediction systems are also used by the method according to the disclosure.

According to a further embodiment, the predefined classes of the road users may include the class vehicle and the class pedestrian, the specific characteristics associated with the class vehicle may include turning signals and heading angles, and the specific characteristics associated with the class pedestrian may include a body orientation and a head orientation. By considering these specific characteristics for each class, the reliability of the trajectory prediction may be improved.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

As used herein, terms like processing unit and module may refer to, be part of, or include an Application Specific Integrated Circuit (ASIC), an electronic circuit, a combinational logic circuit, a field programmable gate array (FPGA), a processor (shared, dedicated, or group) that executes code, other suitable components that provide the described functionality, or a combination of some or all of the above, such as in a system-on-chip. The processing unit may include memory (shared, dedicated, or group) that stores code executed by the processor.

The computer system may be additionally configured to receive static environment data provided by the perception system of the host vehicle and/or by a predetermined map, and to include the static environment data in the prediction of the respective trajectories for the road users.

According to an embodiment, the computer system may further comprise a neural network which may include individual embedding layers for each respective class of the road users in order to separately transform the set of characteristics of the road users for a respective class to the latent features for each respective class of road users. In other words, each predefined class of road users may comprise a separate set of embedding layers for transforming the characteristics of the road users of the respective class to the latent features. Hence, the transforming of the set of characteristics for a respective class of road users is performed in a unique manner. For example, the same transforming parameters may be used for the respective class, i.e. for each of the layers used for the embedding.

Moreover, the neural network may include a prediction network which may constitute the prediction algorithm described above in context of the computer implemented method. Accordingly, the latent features which are provided by the individual embedding layers for each respective class of the road users may be used as an input of the prediction network. Hence, the prediction algorithm may be applied to the allocated latent features via the prediction network for determining respective occupancy information for each class of the road users and for each pixel of the grid map, and the prediction network may also determine the prediction for at least one respective trajectory of each of the road users by using the respective occupancy information for each pixel.

In another aspect, the present disclosure is directed at a vehicle including a perception system and the computer system as described herein.

According to an embodiment, the vehicle may further include a control system being configured to define the actual trajectory of the vehicle. The computer system may be configured to transfer the at least one respective trajectory of each of the road users to the control system in order to enable the control system to incorporate the at least one respective trajectory of each of the road users in defining the actual trajectory of the vehicle.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Exemplary embodiments and functions of the present disclosure are described herein in conjunction with the following drawings, showing schematically:

FIG. 5 is an illustration of examples for results of predicting trajectories of road users.

Corresponding reference numerals indicate corresponding parts throughout the several views of the drawings.

DETAILED DESCRIPTION

Example embodiments will now be described more fully with reference to the accompanying drawings.

Figure 1:
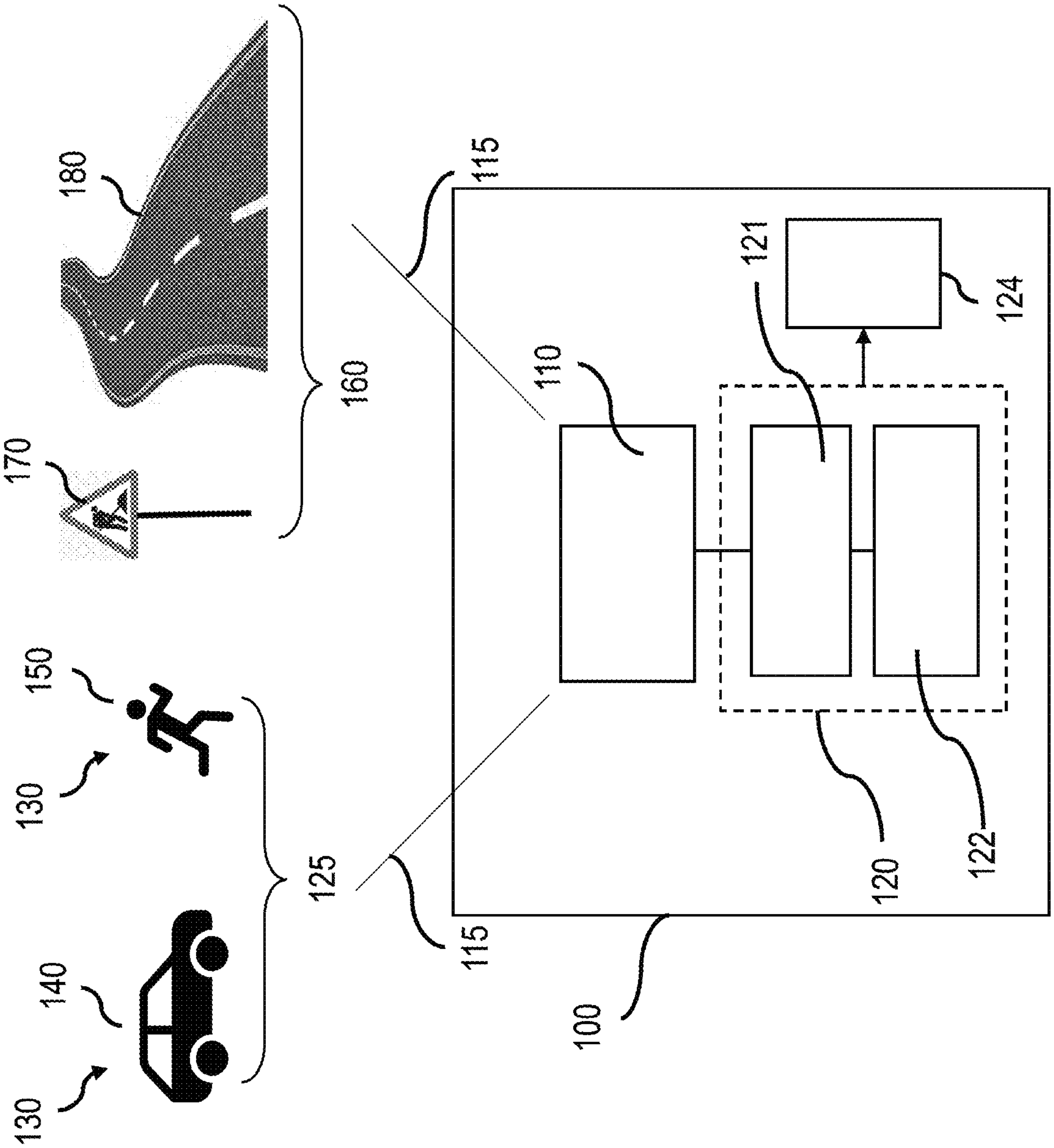
FIG. 1 is an illustration of a vehicle including a computer system according to the disclosure and of the vehicle's surroundings.

FIG. 1 depicts a schematic illustration of a vehicle 100 and of objects possibly surrounding the vehicle 100 in a traffic scene. The vehicle 100 includes a perception system 110 having an instrumental field of view which is indicated by lines 115. The vehicle 100 further includes a computer system 120 including a processing unit 121 and a data storage system 122 which includes a memory and a database, for example. The processing unit 121 is configured to receive data from the perception system 110 and to store data in the data storage system 122. The vehicle 100 further includes a control system 124 which is configured to set and to control the actual trajectory of the vehicle 100.

The perception system 110 may include a radar system, a LiDAR system and/or one or more cameras in order to monitor the external environment or surroundings of the vehicle 100. Therefore, the perception system 110 is configured to monitor a dynamic context 125 of the vehicle 100 which includes a plurality of road users 130 which are able to move in the external environment of the vehicle 100. The road users 130 may include other vehicles 140 and/or pedestrians 150, for example.

The perception system 110 is also configured to monitor a static context 160 of the vehicle 100. The static context 160 may include traffic signs 170 and lane markings 180, for example.

The perception system 110 is configured to determine trajectory characteristics of the road users 130. The trajectory characteristics include a current position, a current velocity and an object class of each road user 130. The current position and the current velocity are determined by the perception system 110 with respect to the vehicle 100, i.e. with respect to a coordinate system having its origin e.g. at the center of mass of the vehicle 100, its x-axis along a longitudinal direction of the vehicle 100 and its y-axis along a lateral direction of the vehicle 100. Moreover, the perception system 100 determines the trajectory characteristics of the road users 130 for a predetermined number of time steps, e.g. for each 0.5 s.

The computer system 120 transfers the result or output of the method according to the disclosure, i.e. at least one respective trajectory (see also FIG. 5) of each of the road users 130, to the control system 124 in order to enable the control system 124 to incorporate the at least one respective trajectory of each of the road users 130 in defining the actual trajectory of the vehicle 100.

Figure 2:
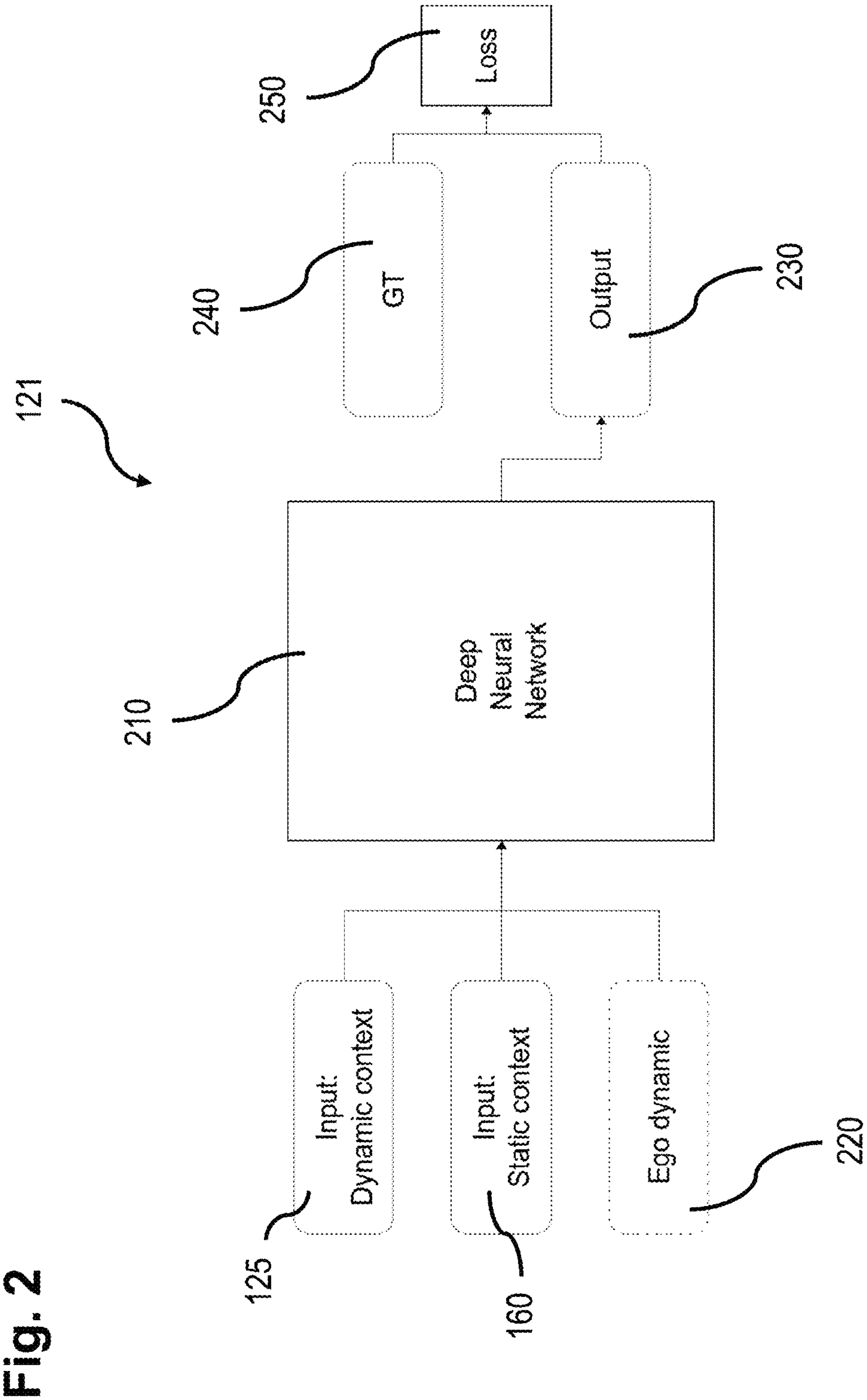
FIG. 2 is an illustration of the vehicle's computer system.

FIG. 2 depicts details of the processing unit 121 which is included in the computer system 120 of the vehicle 100 (see FIG. 1). The processing unit 121 includes a deep neural network 210 which is provided with different inputs. The inputs include the dynamic context 125, i.e. the trajectory characteristics as described above for the road users 130, the static context 160 and ego dynamics 220 of the vehicle 100. The deep neural network 210 is used to generate an output 230. When training the deep neural network 210, the output 230 and a ground truth (GT) 240 are provided to a loss function 250 for optimizing the deep neural network 210.

The static context 160 includes static environment data which include the respective positions and the respective dimensions of static entities in the environment of the vehicle 100, e.g. positions and dimensions of the traffic sign 170 and of the lane markings 180, for example. The static context 160, i.e. the static environment data of the vehicle 100, are determined via the perception system 110 of the vehicle 100 and additionally or alternatively from a predetermined map which is available for the surroundings of the vehicle 100.

The static context 160 is represented by one or more of the following:

- a rasterized image from a HD (high definition) map (see e.g. a visualization thereof at 532 in FIG. 5), wherein the high definition map covers e.g. accurate positions of the lane marking such that a vehicle is provided with accurate information regarding its surrounding when it can be accurately located in the HD map,
- a drivable area determined via the perception system 110 of the vehicle 100, for example a grid map or image data structure, wherein each pixel of such a map or image represent the drivability of the specific area in the instrumental field of view of the perception system 110,
- a lane/road detection via sensors of the perception system 110, wherein using the detected lane markings, road boundaries, guard rails etc. from the sensor, the perception system 110 may be configured to build a grid map or image like data being similar to a rasterized map in order to describe the static context 160, a static occupancy grid map.

The ego dynamics 220 can also be represented as one of the road users 130 and may therefore be included in the dynamic context input. The output 230 provides possible future positions with occupancy probabilities of all road users 130. The output 230 may be represented as a function of time.

The ground truth 240 defines the task of the deep neural network 210. It covers, for example, positions as an occupancy probability and in-grid offsets, and further properties like velocities and accelerations, and/or other regression and classification tasks, for example future positions, velocities, maneuvers etc. of the road users 130 which are monitored within the current traffic scene.

Figure 3:
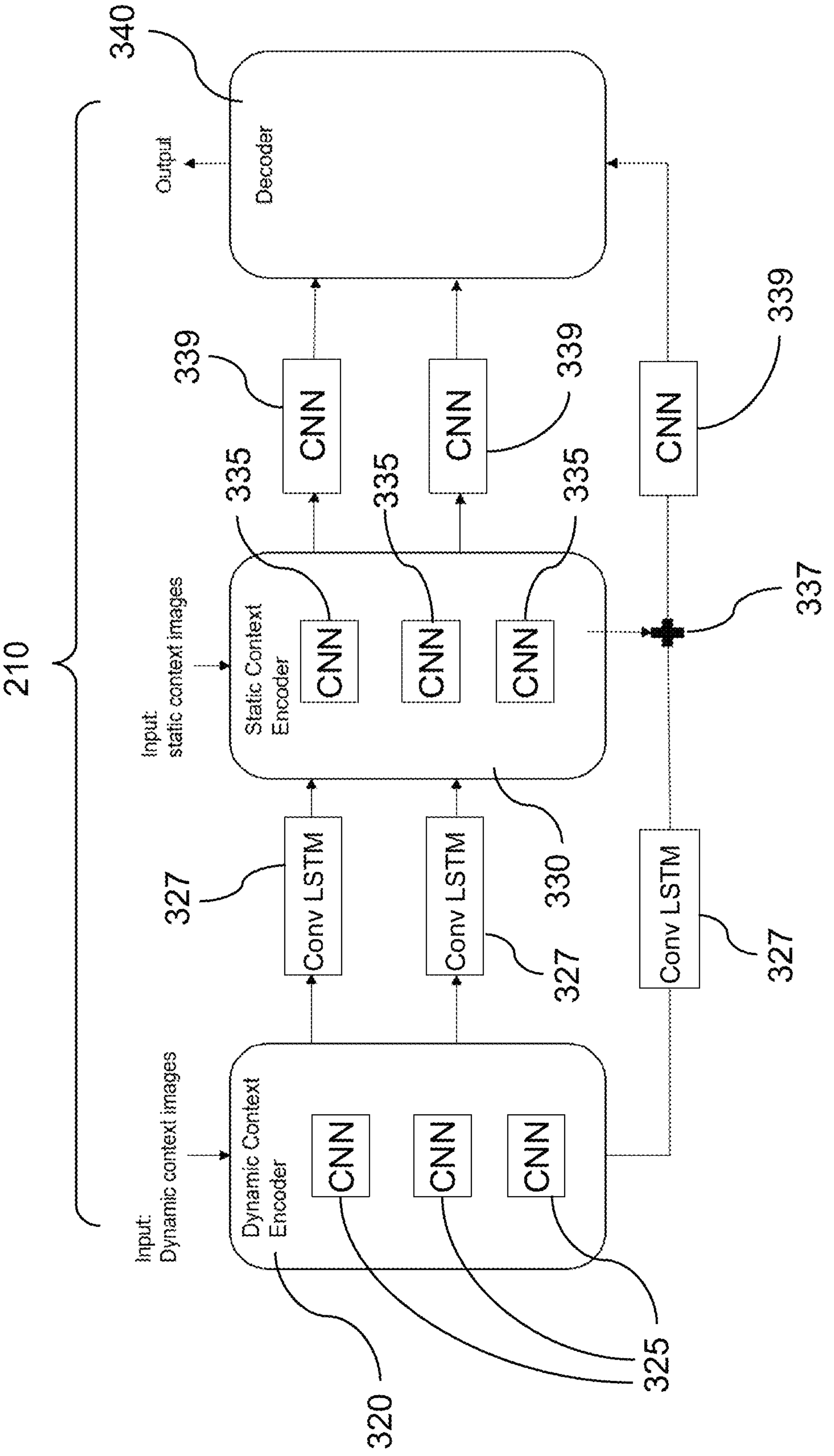
Fig. 3 Related Art
FIG. 3 is an illustration of a network architecture according to the related art.

FIG. 3 depicts an illustration of a network architecture for the deep neural network 210 according to the related art. The dynamic context 125, i.e. a plurality of trajectory characteristics of the road users 130, is provided to a dynamic context encoder or trajectory encoder 320. Similarly, the static context 160 is provided as an input to a static context encoder or map encoder 330.

The respective dynamic and static context 125, 160 is provided to the respective encoder in form of images. That is, the trajectory characteristics of the road users 130 and the properties of the static entities in the environment of the vehicle 100 are rasterized or associated with respective elements of a grid map within a predefined region of interest around the vehicle 100. The predefined region of interest of the vehicle 100 is first rasterized as an empty multi-channel image in which each pixel covers a fixed area. For example, the region of interest may cover an area of 80 m×80 m in front of the vehicle 100 and may be rasterized into an 80×80 pixel image, wherein each pixel represents a square area of 1 m×1 m.

For each pixel of the grid map or image, a respective channel is associated with one of the trajectory characteristics or features of the road users 130. Hence, the empty multi-channel image mentioned above and representing the rasterized region of interest close to the vehicle 100 is filled by the trajectory characteristics of the road users 130 which are associated with the respective channel of the pixel.

The trajectory encoder 320 includes stacked layers of respective convolutional neural networks (CNN) 325. Similarly, the static context encoder 330 also includes stacked layers of convolutional neural networks (CNN) 335. CNNs are suitable for learning the correlation among the data under their kernels. Regarding the input, i.e. the trajectory characteristics of the road users 130, such a data correlation can be intuitively understood as possible interactions among road users 130 and the subsequent effects on their behaviors and trajectories. Similarly, the CNNs 335 of the map encoder 330 extract features from the map or static context which are jointly learned with the trajectory prediction.

Since the trajectory characteristics or the dynamic context of the road users 130 are provided as a series of images which are to be processed by the trajectory encoder 330, whose output is also a series of feature maps or images, convolutional recurrent neural networks in form of e.g. a convolutional long short-term memories (ConvLSTM) 327 are applied to learn the motion in the temporal domain, i.e. the future trajectories of the road users 130.

The output of the convolutional long short-term memory (ConvLSTM) receiving the output of the trajectory encoder 320 and the output of the static context encoder 330 are concatenated on each level represented by a respective ConvLSTM, e.g. at 337. Moreover, further layers of convolutional neural networks (CNN) 339 are provided between the static context encoder and the trajectory decoder 340 as well as between the concatenated output of the convolutional long short-term memory receiving the output of the trajectory encoder 320 and the static context encoder 330, and the trajectory decoder 340. The trajectory decoder 340 generates an output image by applying a transposed convolutional network. That is, respective trajectories are provided by the trajectory decoder 340 for each of the road users 130 for a predetermined number of future time steps.

In detail, the output of the trajectory decoder 340 at each prediction time horizon or future time step includes:

- An image, which may be denoted as $I_t$, which represents the predicted position at future time horizon t. $I_t$ has N different channels, denoted as $I_t^n$, wherein each channel presents the prediction for one type of the road users 130, such as pedestrian or vehicle. The pixel value, between [0,1], of the image represents the possibility (or probability) of that pixel being occupied.
- A two-channel image $O_t$, the pixel values of which represent the in-pixel x and y offsets when this pixel is predicted as the future position in $I_t$. This is because the input and output are all rasterized images, each pixel in such images has a fixed and limited resolution. For example, one pixel may represent a 1 m×1 m area in real world. To achieve better accuracy, the in-pixel offsets are predicted also as a two-channel image. This in-pixel offsets are valid regardless of the specific type of road users 130. For each $$I_t^n$$

a specific offset $O_t$ is provided.

For the deep neural network 210 according to the related art as shown in FIG. 3, the same features or characteristics are required as an input for the dynamic context images regardless of the specific type or class of the road user. For example, the object classes comprise a class for pedestrians and a class for vehicles, and their features or characteristics include a position, a velocity and the type or class for each of the road users 130. However, the different object classes of road users 130 have their own specific characteristics which different from class to class and which may be relevant for predicting the respective trajectory of the road user 130 correctly. For example, a vehicle may include a heading angle and a turning signal as specific features, whereas pedestrians include a body orientation, a head orientation and a gesture as specific features for this object class. The deep neural network according to the related art as shown in FIG. 3 is not able to receive such unique features for a certain object class of road users 130 since these specific characteristics are not associated with a specific channel of the rasterized grid map or image representing the dynamic context.

Figure 4:
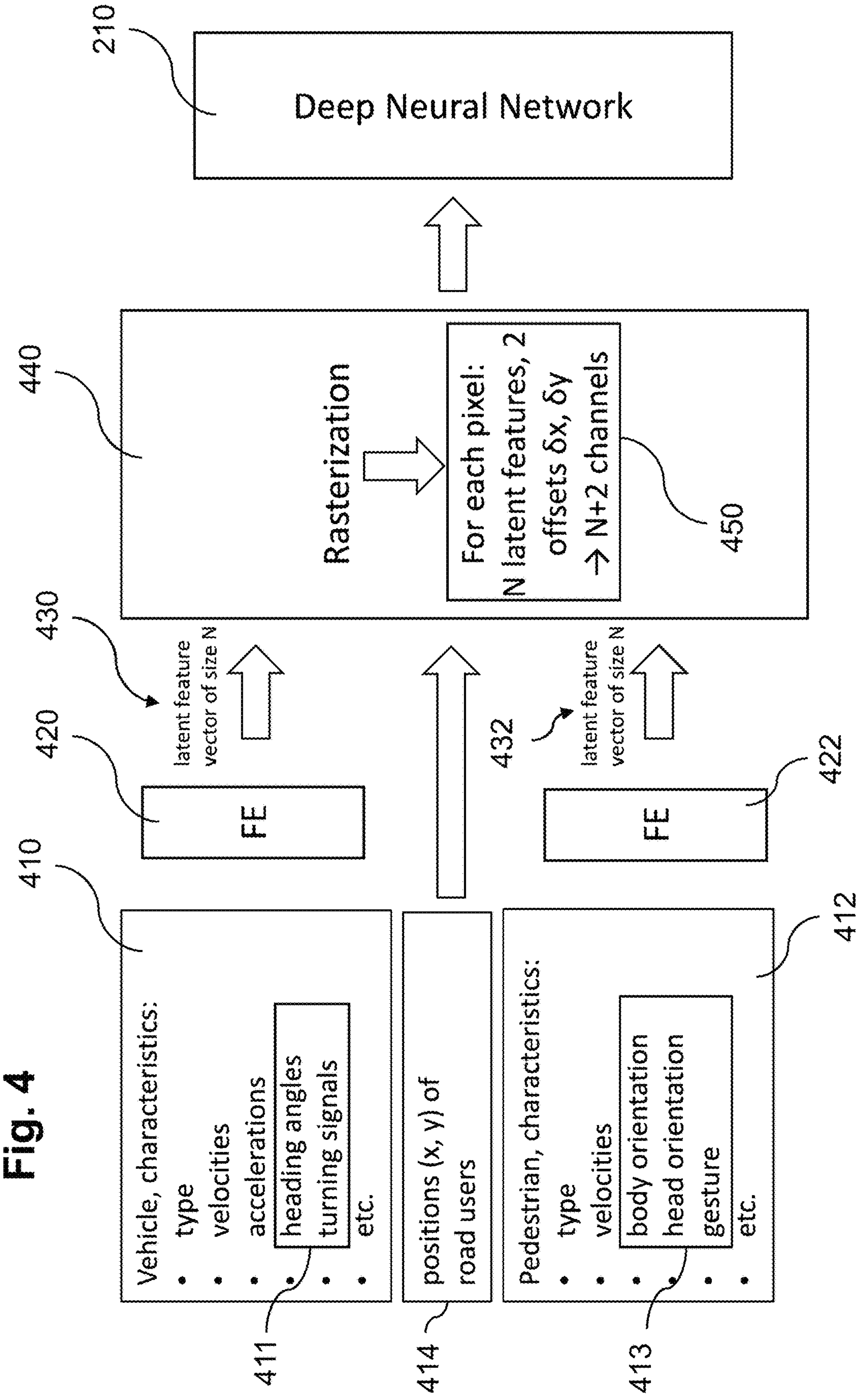
FIG. 4 is an illustration of details of an advanced network architecture according to the disclosure.

In order to overcome this restriction of the method according to the related art, a method according to the present disclosure relies on an advanced network structure which is shown in FIG. 4. As an input for the method, a respective set of characteristics is determined for each road user 130 by the perception system 110 of the host vehicle 100. The set of characteristics includes specific characteristics which are associated with a predefined class of road users 130, i.e. defined for this specific class only. In the example of FIG. 4, a set of characteristics 410 is provided for the predefined object class vehicle, and the set of characteristics 410 includes specific characteristics 411 which comprise heading angles and turning signals of the respective vehicles representing a part of the road users 130. Similarly, for a predefined object class pedestrian, a further set of characteristics 412 is provided which includes specific characteristics 413 comprising a body orientation, a head orientation and a gesture of the respective pedestrians representing a further part of the road users 130.

In addition, both sets of characteristics 410, 412 include a respective type or object class, i.e. vehicle or pedestrian, and the respective velocities and/or accelerations of the respective road users 130. Due to the specific characteristics 411, 413 which are given as different types and include a different total number, the sets of characteristics 410 and 412 differ from each other regarding the type and the total number of characteristics which are covered by the respective set. In addition, respective positions (x, y) 414 of the road users 130 are provided as an input for the method.

The respective sets for the characteristics 410, 412 for the object classes vehicle and pedestrian, respectively, are used as a separate input for a respective feature embedding neural network 420, 422. Each object class of the road users 130 has its own feature embedding neural network 420, 422. In the present example, the feature embedding (FE) neural network 420 is provided for the class "vehicle", whereas the feature embedding (FE) neural network 422 is provided for the class "pedestrian". The output of the respective feature embedding neural network 420, 422 is a respective set of latent features 430, 432 for the respective object class, i.e. for the class vehicle and for the class pedestrian. The sets of latent features 430, 432 are represented as a vector of the same size N. That is, the sets of latent features 430, 432 include the same number N of latent features regardless of the number of characteristics 410, 412 in the original input set. Different sets of trajectory characteristics 410, 412 including different numbers and types of specific characteristics are therefore transformed to a respective vector of latent features 430, 432 having the same size or number N of elements.

The vectors of latent features 430, 432 for the different classes of road users 130 are provided as an input for a rasterization step 440. In addition, the positions (x, y) 440 of the road users 130 are also provided as an input for the rasterization step 440. The rasterization step 440 relies on a rasterization provided for a grid map of the static context 160 (see FIGS. 1 and 2), i.e. on the images including a predefined number of pixels for which the static context of the host vehicle 100 is represented (see also FIG. 3) by respective channels which are associated with a respective pixel resulting from the rasterization of a region of interest for the vehicle 100 (see FIG. 1).

For each road user 130, the latent feature vector 430, 432 is allocated to a pixel position in the grid map based on the respective position (x, y) 414 of the respective road user 130. Hence, such pixels of the grid map are occupied by a latent feature vector only which belong to a respective position (x, y) 414 of the respective road users 130. Conversely, non-occupied pixels where no road users 130 are positioned are set to zero in the rasterization step 440.

The positions (x, y) 414 of the respective road users 130 are represented in the rasterization step 440, i.e. in the grid map by the respective pixel and by the two offsets δx, δy with respect to the center of the respective pixel. The two offsets δx, δy are stored in two channels of the grid map of the respective pixel. In addition, the N latent features which are allocated within the grid map via the rasterization step 440 are also stored in N channels for each pixel. In summary, the grid map includes N+2 channels per pixel.

The result of the rasterization 440, i.e. the grid map including the N+2 channels or data elements per pixel, represents input data 450 for the deep neural network 210 as shown in FIG. 3 which is realized as a machine learning algorithm called CASPNet (Context-Aware Scene Prediction Network). That is, the deep neural network 210 includes the dynamic context encoder 320, the static context encoder 330 and the decoder 340 as shown in FIG. 3.

The respective feature embedding networks 420, 422 which are provided for each object class of the road users 130 are trained together with the deep neural network 210 realized as CASPNet. Therefore, the embedded latent features do not have human interpretable meanings. Nevertheless, the respective N latent features together with the two offsets provide a suitable input for the CASPNet 210 in order to provide a suitable output as described above.

FIG. 5 depicts the results for predicting trajectories by using a method according to the related art (FIG. 5A) and by a method according to the disclosure (FIG. 5B). In a traffic scene under consideration, the host vehicle 100 is moving in a lane 502 and approaches a pedestrian crossing 504. At the same time, the pedestrian 150 whose position is represented by an "x" is moving close to the pedestrian crossing 504. It is not clear a priori whether the pedestrian 150 will use the pedestrian crossing 504 for crossing the lane 502 or not. Via the perception system 110 (see FIG. 1), the vehicle 100 is able to monitor its static context 160 including the course of the lane 502 and the location of the pedestrian crossing 504.

In the example as shown in FIG. 5A, the same trajectory characteristics are used as an input for the method of predicting the trajectories, i.e. the current positions, the current velocities and the respective object classes of the host vehicle 100 and of the pedestrian 150 are used as an input for the method which uses the deep neural network 210 realized as CASPNet as described above in context of FIG. 3. That is, no specific characteristics like the body orientation and the head orientation of the pedestrian 150 are considered in the example as shown in FIG. 5A. The method applied for the example of FIG. 5A outputs two possible trajectories 510, 512 for the pedestrian 150 which are determined for future time steps and represented by arrows derived from CASPNet outputs as described above. As can be seen in FIG. 5A, for the point in time currently considered, i.e. for the current distance of the vehicle 100 to the pedestrian crossing 504, it cannot be expected from the prediction according to the related art that the pedestrian 150 will walk into the pedestrian crossing 504 in order to cross the lane 502.

For the example in FIG. 5B, however, the body orientation and the head orientation of the pedestrian 150 are additionally considered as specific characteristics and used as an input for the method according to the disclosure. The method according to the disclosure predicts three different possible trajectories 520, 522, 524 represented by respective arrows for the pedestrian 150. As can be seen in FIG. 5B, the two predicted trajectories 520, 522 are quite similar to the trajectories 510, 512 as determined by the method according to the related art. The third trajectory 524, however, is directed into the pedestrian crossing 504, i.e. almost perpendicular to the lane 502 and to the moving direction of the host vehicle 100. Hence, the method according to the disclosure predicts already for the same point in time as in FIG. 5A, i.e. for a still quite far distance between the vehicle 100 and the pedestrian crossing 504, that it is quite likely for the pedestrian 150 to move into the lane 502 on the pedestrian crossing 504 in order to cross the lane 502, as indicated by the third trajectory 524 predicted for the pedestrian 150.

In summary, the additional consideration of the specific characteristics "body orientation" and "head orientation" of the pedestrian 150 leads to the prediction of the additional trajectory 524 of the pedestrian 150. Therefore, due to the prediction as shown in FIG. 5B, it can be expected that the pedestrian 150 will enter the pedestrian crossing 504 such that for the future trajectory of the host vehicle 100 it has to be considered to slow down in front of the pedestrian crossing 504 in order to avoid any danger for the pedestrian 150. Hence, the additional consideration of the specific characteristics for the pedestrian 150 increases the safety for the entire traffic scene as shown in FIG. 5B.

Figure 6:
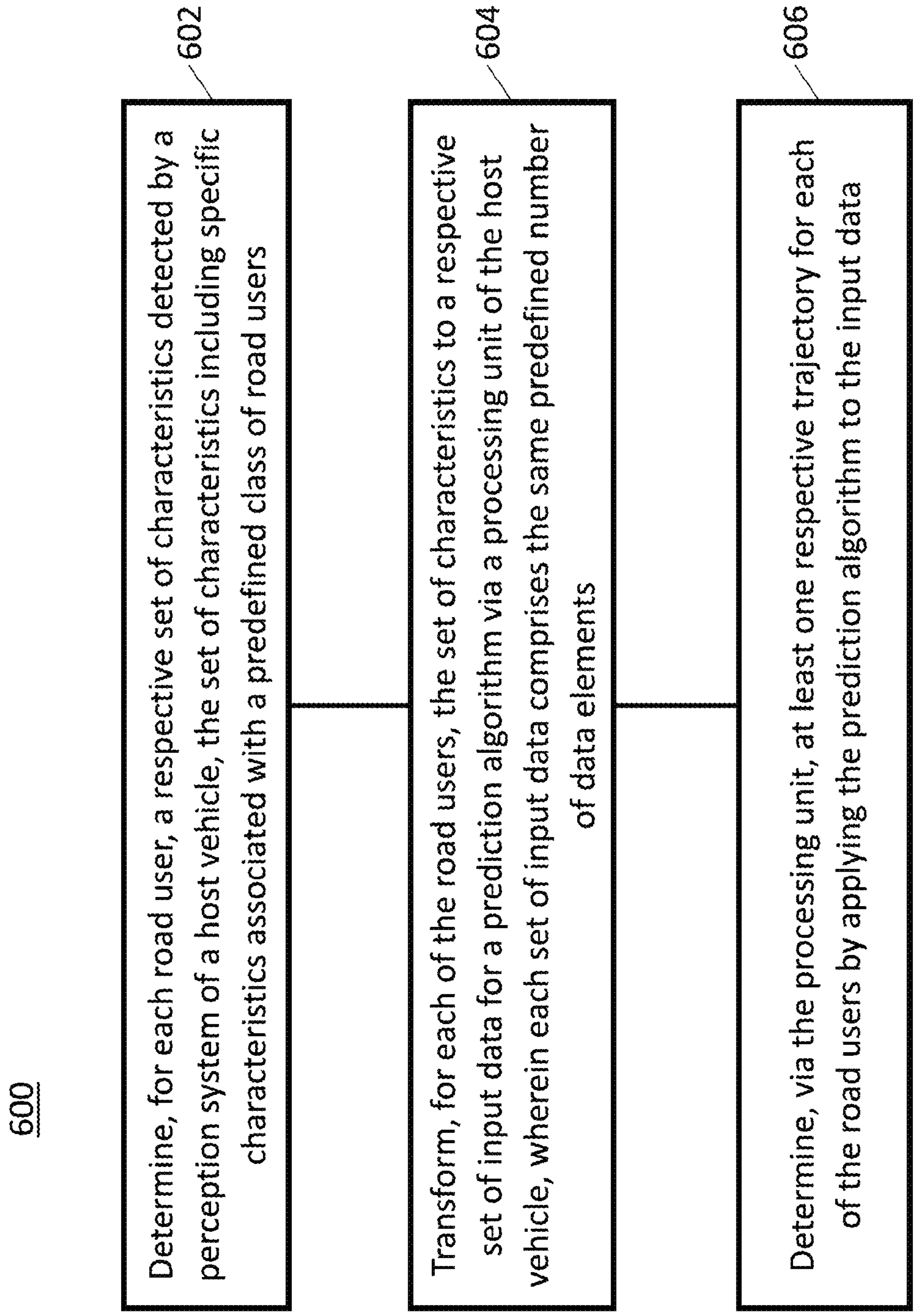
FIG. 6 is a flow diagram illustrating a method for predicting respective trajectories of a plurality of road users in an external environment of a vehicle according to various embodiments.

FIG. 6 shows a flow diagram 600 illustrating a method for predicting respective trajectories of a plurality of road users.

At 602, a respective set of characteristics detected by a perception system of a host vehicle may be determined for each road user, the set of characteristics including specific characteristics associated with a predefined class of road users. At 604, the set of characteristics may be transformed, for each of the road users, to a respective set of input data for a prediction algorithm via a processing unit of the host vehicle, wherein each set of output data may comprise the same predefined number of data elements. At 606, at least one respective trajectory for each of the road users may be determined by applying the prediction algorithm to the input data.

According to various embodiments, each set of input data may include a set of latent features. Transforming the respective set of characteristics for each of the road users to the respective set of input data may comprise applying an embedding algorithm to the respective set of characteristics in order to generate the corresponding set of latent features. The latent features may be allocated to a dynamic grid map of a predefined region of interest in the environment of the host vehicle, wherein the dynamic grid map may include a predefined number of pixels. The prediction algorithm may be applied to the allocated latent features for determining respective occupancy information for each class of the road users for each pixel of the grid map, and the at least one respective trajectory of each of the road users may be determined by using the respective occupancy information for each pixel.

According to various embodiments, transforming the set of characteristics to the respective set of input data may be performed separately for each class of road users by applying a separated embedding algorithm being defined for the respective class to the respective set of characteristics.

According to various embodiments, a number and a type of the specific characteristics may be different for the different classes of road users.

According to various embodiments, applying the prediction algorithm may include: encoding the sets of input data including the allocated latent features, determining static environment data via the perception system of the vehicle and/or a predetermined map, encoding the static environment data, fusing the encoded sets of input data and the encoded static environment data in order to obtain fused encoded features, and decoding the fused encoded features via the processing unit in order to determine the respective occupancy information for each class of the road users and for each pixel of the grid map.

According to various embodiments, a joint training of the embedding algorithm and the prediction algorithm may be performed for the steps of transforming, encoding, fusing and decoding.

According to various embodiments, the static environment data may be provided by a static grid map which includes a first rasterization for the region of interest, and the latent features may be allocated by using a second rasterization of the region of interest, the second rasterization being independent from the first rasterization.

According to various embodiments, a position of the respective road user may be determined by the perception system of the host vehicle, and allocating the latent features to the grid map may rely on the position of the respective road user.

According to various embodiments, the position of the road users may be represented by a pixel of the grid map which is occupied by the road user and by respective offsets in two perpendicular directions with respect to a predetermined position within the respective pixel.

According to various embodiments, the latent features may be concatenated with the offsets for each road user for providing the input data for the prediction algorithm.

According to various embodiments, the set of characteristics may further include common characteristics which are defined for all road users.

According to various embodiments, the predefined classes of the road users may include the class vehicle and the class pedestrian, the specific characteristics associated with the class vehicle may include turning signals and heading angles, and the specific characteristics associated with the class pedestrian may include a body orientation and a head orientation.

Each of the steps 602, 604, 606 and the further steps described above may be performed by computer hardware components.

Figure 7:
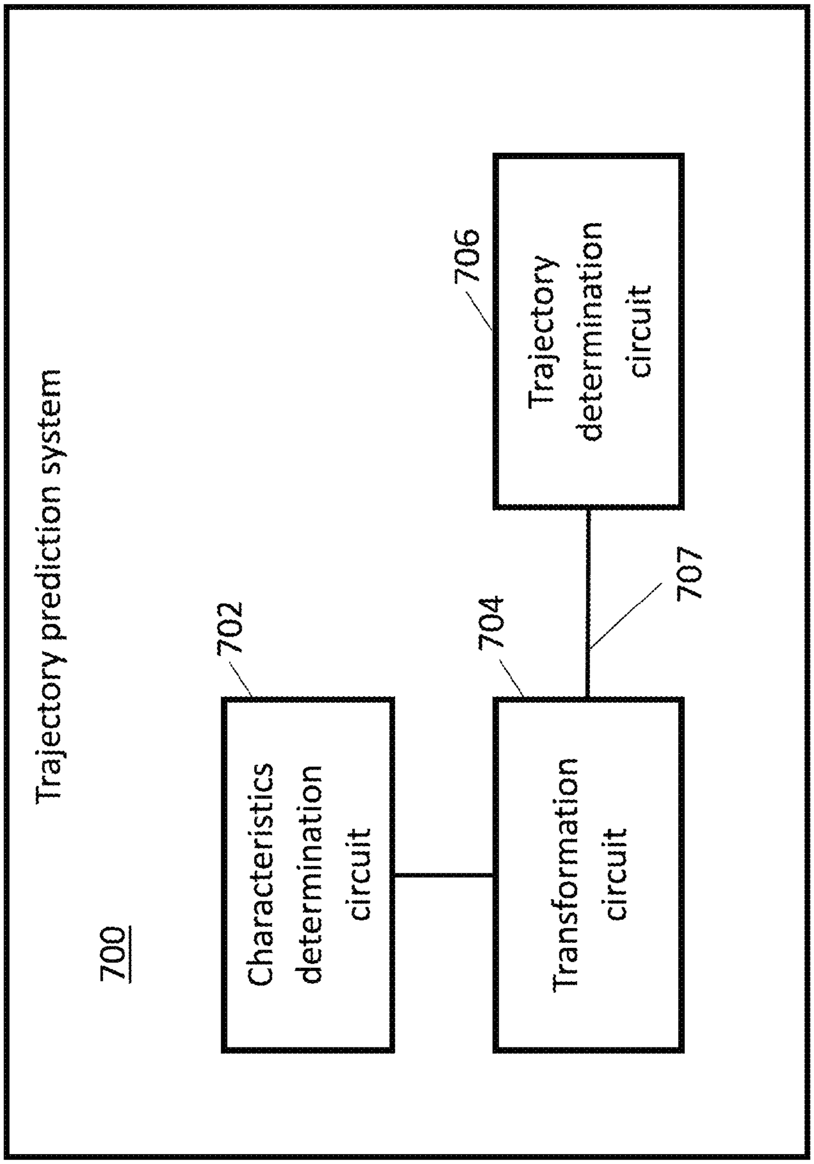
FIG. 7 is an illustration of a system according to various embodiments.

FIG. 7 shows a trajectory prediction system 700 according to various embodiments. The trajectory prediction system 700 may include a characteristics determination circuit 702, a transformation circuit 704 and a trajectory determination circuit 706.

The characteristics determination circuit 702 may be configured to determine, for each road user, a respective set of characteristics detected by a perception system of a host vehicle, the set of characteristics including specific characteristics associated with a predefined class of road users.

The transformation circuit 704 may be configured to transform, for each of the road users, the set of characteristics to a respective set of input data for a prediction algorithm via a processing unit of the host vehicle, wherein each set of input data may comprise the same predefined number of data elements.

The trajectory determination circuit 706 may be configured to determine at least one respective trajectory for each of the road users by applying the prediction algorithm to the input data.

The characteristics determination circuit 702, the transformation circuit 704 and the trajectory determination circuit 706 may be coupled to each other, e.g. via an electrical connection 707, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 8:
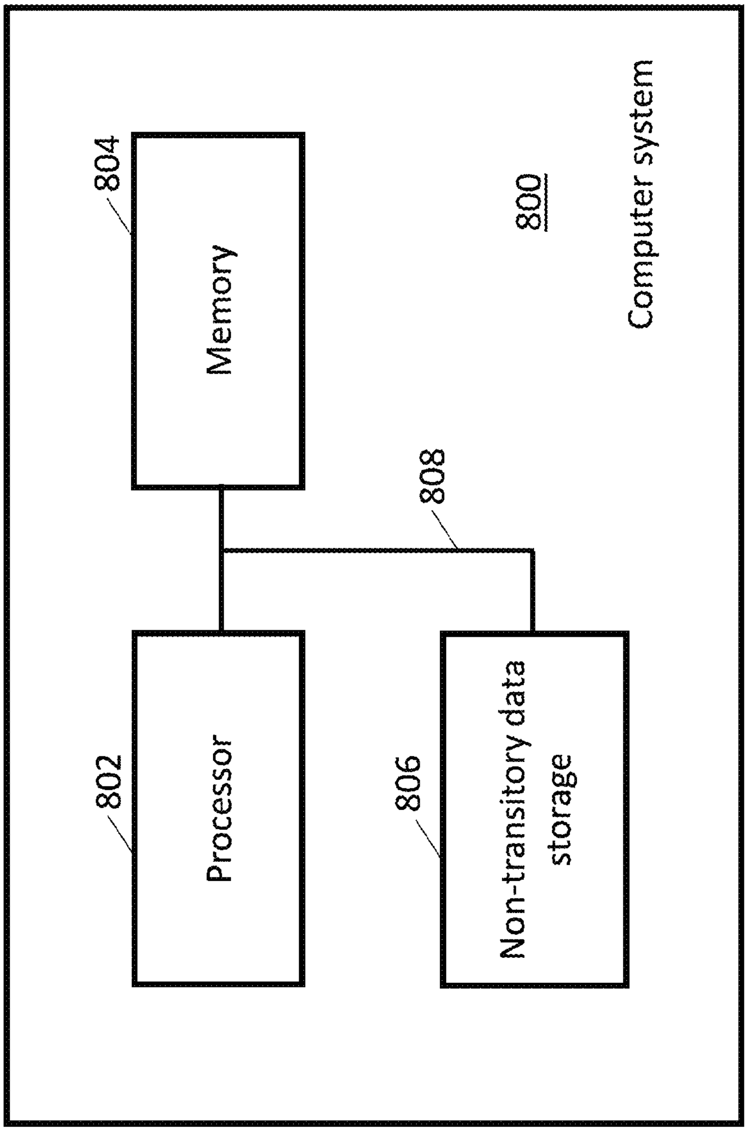
FIG. 8 is a computer system with a plurality of computer hardware components configured to carry out steps of a computer implemented method as described herein.

FIG. 8 shows a computer system 800 with a plurality of computer hardware components configured to carry out steps of a computer implemented method for predicting respective trajectories of a plurality of road users according to various embodiments. The computer system 800 may include a processor 802, a memory 804, and a non-transitory data storage 806.

The processor 802 may carry out instructions provided in the memory 804. The non-transitory data storage 806 may store a computer program, including the instructions that may be transferred to the memory 804 and then executed by the processor 802.

The processor 802, the memory 804, and the non-transitory data storage 806 may be coupled with each other, e.g. via an electrical connection 808, such as e.g. a cable or a computer bus or via any other suitable electrical connection to exchange electrical signals.

As such, the processor 802, the memory 804 and the non-transitory data storage 806 may represent the characteristics determination circuit 702, the transformation circuit 704 and the trajectory determination circuit 706, as described above.

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the trajectory prediction system 700 and/or for the computer system 800.

REFERENCE NUMERAL LIST

100 vehicle
110 perception system
115 field of view
120 computer system
121 processing unit
122 memory, database
124 control system
125 dynamic context
130 road users
140 vehicle
150 pedestrian
160 static context
170 traffic sign
180 lane markings
210 deep neural network
220 ego dynamic of the host vehicle
230 output of the deep neural network
240 ground truth
250 loss function
320 dynamic context encoder
325 convolutional neural network (CNN)
327 convolutional long-short-term memory (ConvLSTM)
330 static context encoder
335 convolutional neural network (CNN)
337 concatenation
339 convolutional neural network (CNN)
340 decoder
410 trajectory characteristics for the class vehicle
411 specific characteristics for the class vehicle
412 trajectory characteristics for the class pedestrian
413 specific characteristics for the class pedestrian
414 positions of the road users
420 feature embedding network for the class vehicle
422 feature embedding network for the class pedestrian
430 latent features for the class vehicle
432 latent features for the class pedestrian
440 rasterization, allocation of latent features to grid map
450 input data for prediction algorithm
502 lane
504 pedestrian crossing
510 predicted trajectory of the pedestrian according to the related art
512 predicted trajectory of the pedestrian according to the related art
520 predicted trajectory of the pedestrian according to the disclosure
522 predicted trajectory for the pedestrian according to the disclosure
524 predicted trajectory of the pedestrian according to the disclosure
600 flow diagram illustrating a method for predicting respective trajectories of a plurality of road users
602 step of determining, for each road user, a respective set of characteristics detected by a perception system of a host vehicle, the set of characteristics including specific characteristics associated with a predefined class of road users
604 step of transforming, for each of the road users, the set of characteristics to a respective set of input data for a prediction algorithm via a processing unit of the host vehicle, wherein each set of input data comprises the same predefined number of data elements
606 step of determining at least one respective trajectory for each of the road users by applying the prediction algorithm to the input data
700 trajectory prediction system
702 characteristics determination circuit
704 transformation circuit
706 trajectory determination circuit
707 connection
800 computer system according to various embodiments
802 processor
804 memory
806 non-transitory data storage
808 connection

What is claimed is:

1. A computer implemented method for predicting respective trajectories of a plurality of road users, the method comprising:

determining, for each road user, a respective set of characteristics detected by a perception system of a host vehicle, the set of characteristics including specific characteristics associated with a predefined class of road users, a number of characteristics in the respective set of characteristics being different for different classes of road users, and a number and a type of the specific characteristics being different for the different classes of road users;

transforming, for each of the road users, the set of characteristics to a respective set of input data for a prediction algorithm via a processing unit of the host vehicle, wherein each set of input data comprises the same predefined number of data elements that represent the set of input data;

determining, via the processing unit, at least one respective trajectory for each of the road users by applying the prediction algorithm to the input data; and controlling, with a control system, an actual trajectory of the host vehicle based on the at least one respective trajectory determined for each of the road users;

wherein:

each set of input data includes a set of latent features;

transforming the respective set of characteristics for each of the road users to the respective set of input data comprises applying an embedding algorithm to the respective set of characteristics in order to generate the corresponding set of latent features;

the latent features are allocated to a dynamic grid map of a predefined region of interest in the environment of the host vehicle, the dynamic grid map including a predefined number of pixels;

the prediction algorithm is applied to the allocated latent features for determining respective occupancy information for each class of the road users for each pixel of the grid map; and the at least one respective trajectory for each of the road users is determined by using the respective occupancy information for each pixel.

2. The method according to claim 1, wherein transforming the set of characteristics to the respective set of input data is performed separately for each class of road users by applying a separated embedding algorithm being defined for the respective class to the respective set of characteristics.

3. A non-transitory computer readable medium comprising instructions for carrying out the computer implemented method of claim 1.

* * * * *